US009262476B2

(12) United States Patent
Eliáš et al.

(10) Patent No.: US 9,262,476 B2
(45) Date of Patent: Feb. 16, 2016

(54) SYSTEM AND METHOD FOR BATCH QUERY PROCESSING

(71) Applicant: Red Hat, Inc., Raleigh, NC (US)

(72) Inventors: Filip Eliáš, Vysni Lhoty (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 195 days.

(21) Appl. No.: 14/152,419

(22) Filed: Jan. 10, 2014

(65) Prior Publication Data

US 2015/0199404 A1 Jul. 16, 2015

(51) Int. Cl.
*G06F 17/30* (2006.01)

(52) U.S. Cl.
CPC ................... *G06F 17/30451* (2013.01)

(58) Field of Classification Search
CPC .................................................. G06F 17/30451
See application file for complete search history.

(56) References Cited

U.S. PATENT DOCUMENTS

| 5,557,773 | A * | 9/1996 | Wang .................. G06F 17/5009 |
| 6,473,750 | B1 * | 10/2002 | Petculescu ........ G06F 17/30457 707/600 |
| 7,127,456 | B1 * | 10/2006 | Brown .............. G06F 17/30306 |
| 7,437,371 | B2 * | 10/2008 | Rathakrishnan .. G06F 17/30595 |
| 7,523,118 | B2 | 4/2009 | Friedlander et al. |
| 8,285,709 | B2 | 10/2012 | Candea et al. |
| 8,538,985 | B2 | 9/2013 | Betawadkar-Norwood et al. |
| 8,847,957 | B1 * | 9/2014 | Keller ...................... G06T 15/06 345/420 |
| 2004/0098359 | A1 * | 5/2004 | Bayliss ............. G06F 17/30445 |
| 2005/0192937 | A1 * | 9/2005 | Barsness ................... G06F 9/50 |
| 2007/0055555 | A1 * | 3/2007 | Baggett ............. G06F 17/30457 705/5 |
| 2008/0027920 | A1 * | 1/2008 | Schipunov ........ G06F 17/30545 |
| 2008/0172356 | A1 | 7/2008 | Bruno et al. |
| 2011/0153593 | A1 * | 6/2011 | Zhou ................. G06F 17/30454 707/718 |

(Continued)

FOREIGN PATENT DOCUMENTS

WO    WO 02/071260 A1    9/2002

OTHER PUBLICATIONS

Zhou et al., "Efficient Exploitation of Similar Subexpressions for Query Processing," Microsoft Research; Humboldt-Univ. zu Berlin; Dresden Univ. of Tech., Jun. 11-14, 2007, 12 pages, http://research.microsoft.com/en-us/um/people/jrzhou/pub/cse.pdf.

(Continued)

*Primary Examiner* — Jorge A Casanova
(74) *Attorney, Agent, or Firm* — Haynes and Boone, LLP

(57) ABSTRACT

A system and method of batch query processing includes accumulating data queries in a query holding area of a query assistant running in a computer server, separating the accumulated data queries into a plurality of partitions, ordering the partitions, ordering the accumulated data queries within each of the partitions, and processing the accumulated data queries in an order based on the ordering of the partitions and the ordering of the data queries within each of the partitions. Each of the partitions includes data queries with a respective from-type. Each respective from-type is associated with a combination of storage tables accessed by each of the data queries in a corresponding partition. In some examples, ordering the accumulated data queries within each of the partitions includes processing the data queries in each partition against a test data set and ordering the data queries based on results of the processing.

18 Claims, 3 Drawing Sheets

(56) References Cited

U.S. PATENT DOCUMENTS

| | | | | |
|---|---|---|---|---|
| 2011/0302164 | A1* | 12/2011 | Krishnamurthy | G06F 17/30979 707/737 |
| 2012/0197868 | A1* | 8/2012 | Fauser | G06F 17/30286 707/714 |
| 2013/0262443 | A1* | 10/2013 | Leida | G06F 17/30427 707/722 |

OTHER PUBLICATIONS

Papadopoulos et al., "Multiple Range Query Optimization in Spatial Databases," Department of Informatics, Aristotle University, retrieved Jan. 10, 2014, pp. 71-82, 12 pages total, http://citeseerx.ist.psu.edu/viewdoc/download?doi=10.1.1.24.3360&rep=rep1&type=pd.

Deshpande et al., "Adaptive Query Processing," University of Maryland; University of Pennsylvania; IBM Almaden, 2007, 140 pages, http://infolab.stanford.edu/~hyunjung/cs346/app-survey.pdf.

Bosc et al., "Semantic Proximity Between Queries and the Empty Answer Problem," IRISA/ENSSAT, Universit'e de Rennes, 2009, pp. 259-264, 6 pages total, http://www.academia.edu/928971/Semantic_Proximity_Between_Queries_and_the_Empty_Answer_Problem.

Quilitz et al., "Querying Distributed RDF Data Sources with SPARQL," Humboldt-Universität zu Berlin, retrieved Jan. 10, 2014, 15 pages, https://www.sar.informatik.hu-berlin.de/wbi/research/publications/2008/DARQ-FINAL.pdf.

* cited by examiner

SYSTEM AND METHOD FOR BATCH QUERY PROCESSING

BACKGROUND

The present disclosure relates generally to computing systems, and more particularly to batch query processing.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and provide computing services for each other. In order to do so, a server or some other computing system may provide an interface through which service requests are made by the other computing devices or clients. In these service-oriented architectures (SOAs), the clients generally make a service request by sending a request message to the server hosting a requested service and/or application using, for example, a networking protocol. The server receives the message, activates the requested service or application, and returns a response message with the result. For example, a very basic form of services is demonstrated by a request for a web page. A client, such as a web browser, sends a Hypertext Transport Protocol (HTTP) request to a web server which receives the HTTP request and generates a response containing the requested web page, that is then returned to the web browser. As many services and/or applications execute, they access one or more data sources that store data that is relevant to the requested services using queries. For example, these data sources may include relational databases, nosql databases, files, web services, and/or the like. As the data sources receive the queries from the services and/or applications, they are typically processed in a first-come first-served fashion. In many situations the order in which the queries are processed by the data sources may not be the most efficient as the services and/or applications are not generally expected to cooperate among themselves and/or know a preferred order for processing the queries from the perspective of the data sources. When the services and/or applications are able to allow their respective queries to be processed in a batch mode, rather than a first-come first-served fashion, it may be possible to improve efficiency in the handling of queries by appropriately changing the order in which they are processed.

Accordingly, it would be desirable to provide systems and methods to improve batch query processing efficiency by changing the order in which queries are processed.

SUMMARY

According to one example, a method of processing data source queries includes accumulating the data source queries in a query holding area of a query assistant running in a computer server, separating the accumulated data source queries into a plurality of partitions, ordering the partitions, ordering the accumulated data source queries within each of the partitions, and processing the accumulated data source queries in an order based on the ordering of the partitions and the ordering of the data source queries within each of the partitions. Each of the partitions includes data source queries with a respective from-type. Each respective from-type is associated with a combination of storage tables accessed by each of the data source queries in a corresponding partition.

According to another example, a query assistant hosted in an application server includes a query manager, a query holding area coupled to the query manager, a query queue coupled to the query manager, and a query engine coupled to the query manager and the query queue. The query holding area is configured to accumulate queries received by the query assistant. The query manager is configured to separate the queries in the query holding area into a plurality of disjoint sets, sort the disjoint sets, sort the queries within each of the disjoint sets, and insert the queries into the query queue based on the sorting of the disjoint sets and the sorting of the queries within each of the disjoint sets. The query engine is configured to remove the queries in order from the query queue and process the queries. Each of the disjoint sets includes queries with a respective from-type. Each respective from-type is associated with a combination of data tables accessed by each of the queries in a corresponding disjoint set.

According to yet another example, a non-transitory machine-readable medium comprising a plurality of machine-readable instructions which when executed by one or more processors associated with an application server are adapted to cause the one or more processors to perform a method. The method includes accumulating data queries in a query holding area until an accumulation threshold is reached, separating the data queries into a plurality of partitions, ordering the partitions, ordering the data queries within each of the partitions, inserting the accumulated data queries into the FIFO queue based on the ordering of the partitions and the ordering of the data queries within each of the partitions, removing the data queries in order from the FIFO queue, and processing the data queries. The accumulation threshold is based on a combination of one or more criteria selected from a group consisting of a number of data queries that are accumulated in the query holding area, a predetermined period of time, and whether a first-in first-out (FIFO) queue containing previously accumulated data queries is empty. Each of the partitions includes data queries with a respective from-type, with each respective from-type being associated with a combination of tables accessed by each of the data source queries in a corresponding partition.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
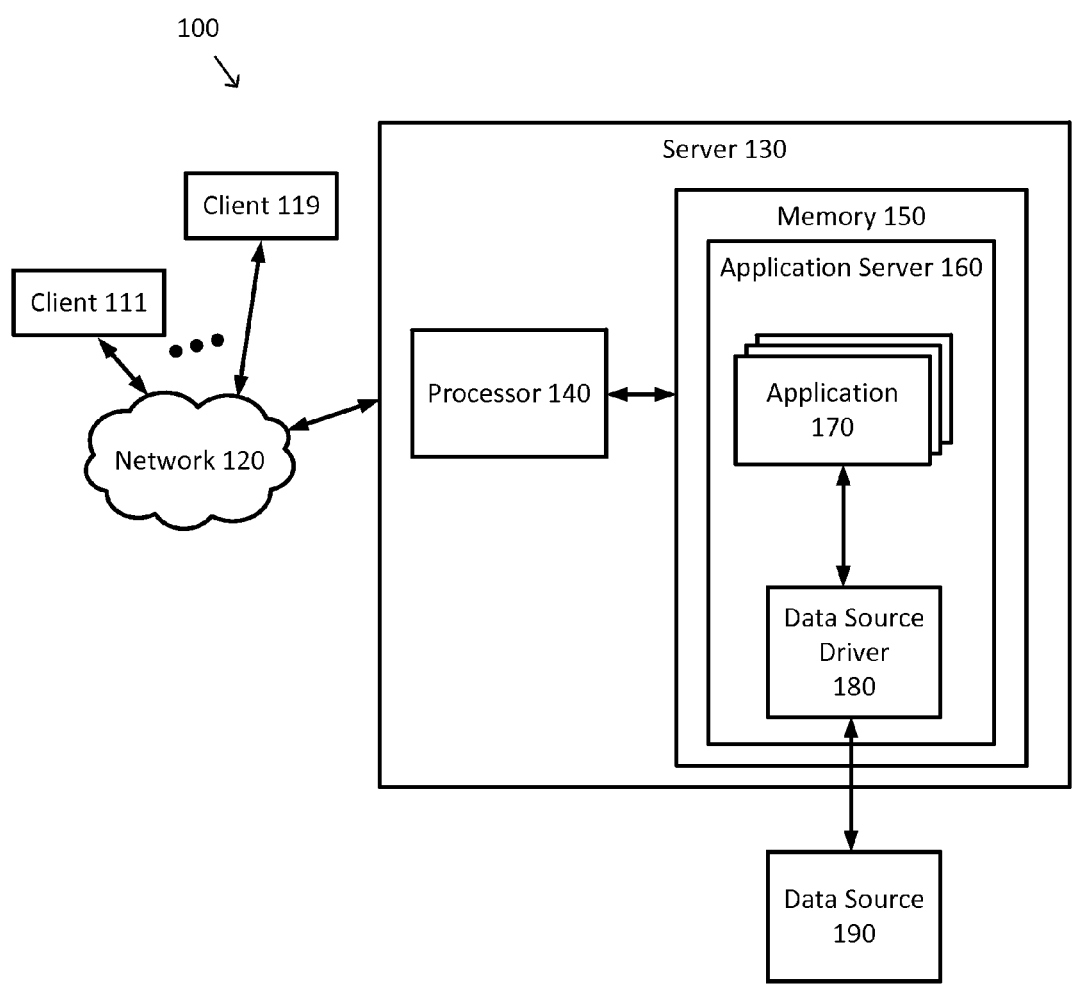
FIG. 1 is a simplified diagram of a service-oriented architecture according to some examples.

FIG. 1 is a simplified diagram of a service-oriented architecture (SOA) 100 according to some examples. As shown in FIG. 1, SOA 100 is built around a client-service model. In SOA 100, service requests originate from one or more clients 111-119. Each of the clients 111-119 may make service requests through a network 120 to a server 130. Network 120 may be any kind of network including a local area network (LAN), such as an Ethernet, and/or a wide area network (WAN), such as the internet. In some examples, server 130 may be a standalone workstation, a cluster, a production server, within a virtual machine, and/or the like. Server 130 includes a processor 140 coupled to memory 150. In some examples, processor 140 may control operation and/or execution of hardware and/or software on server 130. Although only one processor 140 is shown, server 130 may include multiple processors, CPUs, multi-core processors, field programmable gate arrays (FPGAs), application specific integrated circuits (ASICs), and/or the like. Memory 150 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 150 may be used to store an application server 160. Application server 160 includes one or more interfaces for receiving service requests from the one or more clients 111-119. Each of the service requests is then directed to at least one of the one or more services or applications 170 being hosted by application server 160. Numerous mechanisms for directing the service requests to the respective application 170 may be used including providing a uniform resource locator (URL) for the application in the respective service request, providing an application name of the application in the respective service request, and/or the like. The service requests may also be made using protocols such as remote procedure call, web services, and/or the like.

As each of the applications 170 handles its respective service requests, each application 170 is often called upon to access data in one or more data sources. This typically includes identifying a data source, forming a query to access the data source, and forwarding the query to a data source driver 180. Data source driver 180 then accesses a corresponding data source 190 where the query is handled. When processing of the query completes, a response is typically generated and returned to application 170 through data source driver 180. In some examples, each application 170 may forward the query to data source driver 180 using an application programming interface (API) call, and/or the like. In some examples, data source driver 180 may be an open database connectivity (ODBC) driver, a java database connectivity (JDBC) driver, and/or the like. In some examples, data source 190 may be a relational database, a nosql database, a flat file, an eXtensible Markup Language (XML) file, a representational state transfer (REST) web service, a Simple Object Access Protocol (SOAP) web service, and/or the like. In some examples, the query may retrieve data from data source 190 and/or write data to data source 190.

As discussed above and further emphasized here, FIG. 1 is merely an example which should not unduly limit the scope of the claims. One of ordinary skill in the art would recognize many variations, alternatives, and modifications. In some examples, other architectures may be used with application server 160. In some examples, application server 160 may be hosted in one or more virtual machines and/or Java virtual machines running on server 130. In some examples, server 130 and/or memory 150 may also be used to host more than one application server. In some examples, application server 160 may include more than one data source driver 180 for accessing additional data sources 190. In some examples, each of the data sources 190 may be of different types. In some examples, one or more of the data sources may be hosted in server 130, coupled to server 130 using connectors and/or cabling, and/or coupled to server 130 over a network, such as network 120.

The architecture and approach of FIG. 1 does not generally make the most effective use of data source 190. This is because data source 190 generally receives and then handles the queries it receives from the application 170 in a first-come first-served fashion. The first query received is generally the first one to be processed absent any multi-processing capability in data source 190. When only one application 170 is sending queries to data source 190 and the order of the queries is generally serial in nature, the first-come first-served processing model works well. However, as multiple applications 170 begin making queries in parallel and/or the queries being made by any of the applications 170 may be handled in a batch fashion, the first-come first-served processing model may not make the best use of data source 190. For example, the one or more computing systems implementing data source 190 may use one or more buffering and/or caching systems to improve performance. In some examples, the buffering and/or caching systems may be associated with storage devices, storage servers, processors, and/or the like. By changing the order in which queries are processed in data source 190, it may be possible to improve the hit rate of one or more of the buffering and/or caching systems. This may in turn, improved the performance and/or efficiency of data source 190.

In general, it is not practical for the applications 170 or data source driver 180 to know the best way to optimize hit ratios in the buffering and/or caching systems of data source 190. In some examples, this may be because of changing hardware, software, configurations, and/or the like associated with data source 190. In some examples, when data source 190 is hosted in a virtual machine and the virtual machine is moved between platforms the number, location, and/or behavior of the buffering and/or caching systems used by data source 190 may change in a way that is unknown to the applications 170 and/or data source driver 180. In some examples, the general principles of sound system development may also preclude making knowledge of the buffering and/or caching of data source 190 to applications 170 and/or data source driver 180 due to a desire to abstract the details in the implementation of data source 190. This allows, for example, the developers of applications 170 to access data sources using standardized interfaces like ODBC, JDBC, and/or the like as well as to use a structured query language (SQL).

Despite these difficulties, it may still be possible for the applications 170, the data source driver 180, and/or a query managing system to leverage general knowledge of buffering and/or caching to improve the order in which queries are processed. Consider a situation where several queries are to be processed by data source 190. For example, assume that the first query returns 100 results from a first storage table, a second query returns 50 results from the first storage table, a third query returns 85 results from a combination of the first storage table and a second storage table, and a fourth query returns 18 results from a third storage table. Even without knowing more about the four queries, it may still be possible to predict, at least statistically, which of the queries are more likely to generate cached results that may result in higher hit rates for the other queries. For example, it is more statistically likely that more of the results from the second query may be included within the results of the first query than the other way around because it is more likely that the 50 results of the second query may be found in the 100 results of the first query than the 100 results of the first query will be found in the 50 results of the second query. Similarly, the results of the first query and/or the second query are more likely to be found in the results of the third query than the other way around because there is no data associated with the second data storage table in the results of the first and second queries, whereas there are results from the first data storage table in the results of the third query. In some examples, caching hit rates may also be adversely affected when the fourth query is processed in between the first and second queries as any caching for the fourth query may invalidate cached data that might otherwise be helpful for the second of the first or second queries to be processed. In some examples, these same observations may also apply to intermediate and/or temporary results that are cached and/or buffered by data source 190 during processing of the respective queries.

Figure 2:
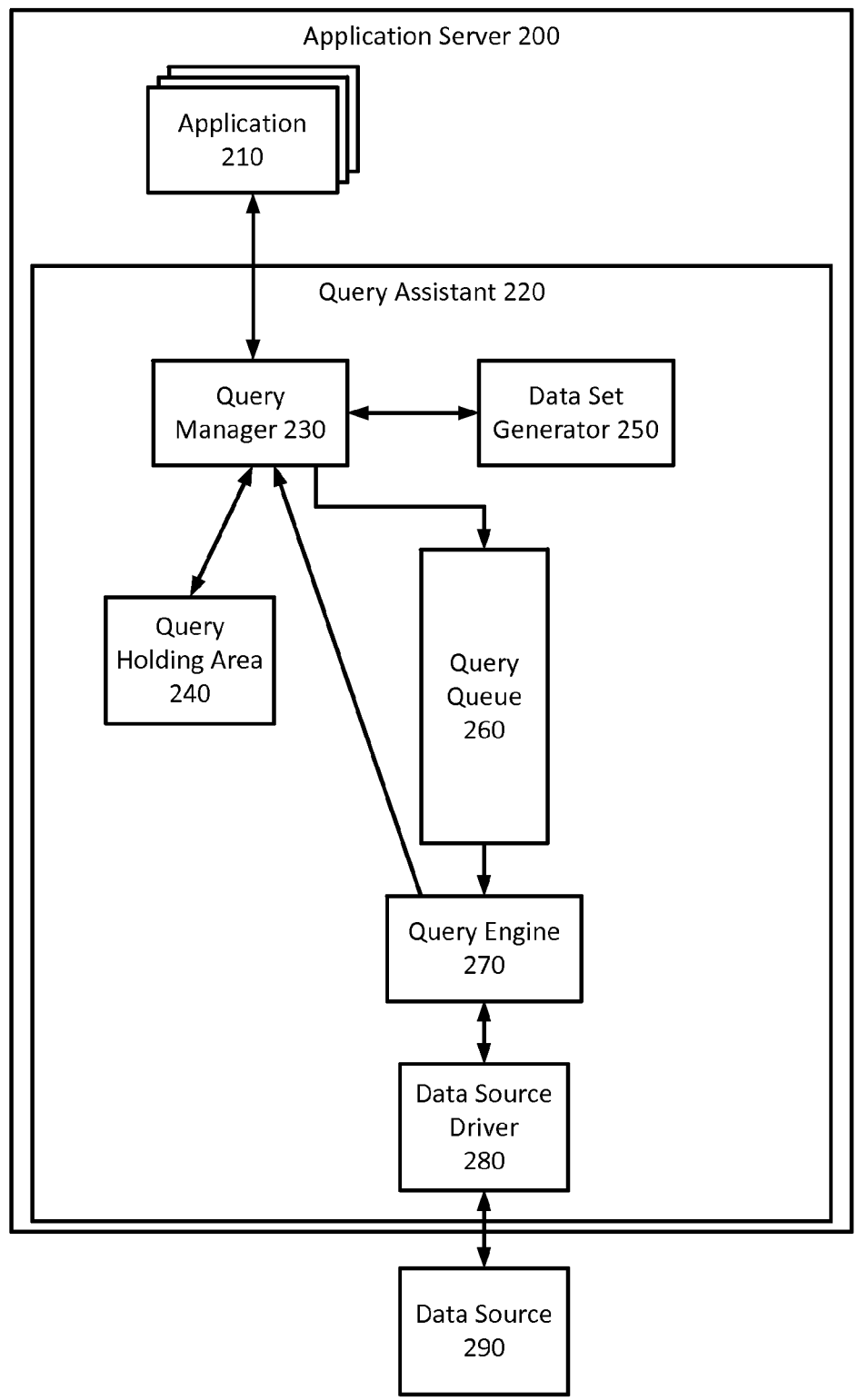
FIG. 2 is a simplified diagram of an application server hosting a query assistant according to some examples.

FIG. 2 is a simplified diagram of an application server 200 hosting a query assistant 220 according to some examples. As shown in FIG. 2, application server 200 hosts one or more applications 210. In some examples, each of the applications 210 may be similar to the applications 170 except that they may be adapted for use with query assistant 220. Rather than directing queries to individual data source drivers, each of the applications 210 directs its queries to an interface of query assistant 220. In some examples, each application 170 may direct the queries to the interface of query assistant 220 using an API call, and/or the like. In some examples, the interface may be similar to an ODBC, a JDBC, and/or other data source driver interfaces.

When a query is received at query assistant 220, it is directed to a query manager 230, which controls and/or coordinates the operation of query assistant 220 and its various sub-components. When the query may be processed in a batch mode, such as by a designation included in the query, the query may be placed in a query holding area 240. In some examples, one of the applications 210 may include the designation as a parameter and/or other setting when the query is made to query assistant 220. Query holding area 240 may include one or more collection-type data structures for keeping a copy of the query and/or other metadata associated with the query. Query holding area 240 acts as a temporary staging area for the query until it is processed later.

Query manager 230 may accumulate the queries it receives in query holding area 240 until it determines that an accumulation threshold is reached and it is time to process a batch of queries. In some examples, query manager 230 may wait until a designated number of queries are received and placed in query holding area 240. In some examples, the designated number of queries may be set by an administrator of query assistant 220. In some examples, the designated number of queries may be based on a storage capacity of query holding area 240 and/or some other resource of query assistant 220. In some examples, query manager 230 may process the queries in query holding area 240 at a periodic interval. In some examples, the length of the periodic interval may be set by an administrator of query assistant 220. In some examples, the periodic interval may be set based on a maximum latency allowed before a query should be processed. In some examples, query manager 230 may process the queries in query holding area 240 when processing of the last batch of accumulated queries completes or is about to complete. In some examples, a combination of one or more of these criteria may be used to determine when the next batch of queries is processed.

In some examples, the number of queries allowed to accumulate in query holding area 240 may be adjusted to balance between more effective query processing and more responsiveness in responding to queries in general. As the number of queries that accumulate increases, it is more likely that query manager 230 will be able to determine a query processing order that improves query processing effectiveness at the expense of a general increase in the latency in responding to queries as more queries are allowed to accumulate before they are processed. In contrast, when a fewer number of queries are allowed to accumulate, processing of the accumulated queries occurs more often and with generally shorter latency, but with a lower likelihood that query manager 230 will be able to improve processing efficiency due to the smaller number of accumulated queries.

When query manager 230 determines that it is time to process the accumulated queries in query holding area 240, query manager 230 arranges the accumulated queries into an order for processing by a data source 290 using a two phase process. In the first phase, the accumulated queries are divided into disjoint sets or partitions of queries based on the one or more storage tables accessed by each of the queries, and the partitions are ordered. The queries in each of the partitions are then ordered within the partition, in the second phase. The ordering of the partitions and the ordering of queries within the partition are then used to determine an order in which the queries are added to a first-in first out (FIFO) query queue 260.

To divide the queries into partitions during the first phase, query manager 230 examines each of the queries to determine which storage tables (e.g., database tables) the query accesses data from. This is referred to as the from-type for the query. For example, the query "SELECT FROM PEOPLE WHERE . . . " has a from-type of PEOPLE, and the query "SELECT FROM PEOPLE INNER JOIN ADDRESSES WHERE . . . " has a from type of PEOPLE, ADDRESSES. In some examples, when the possible storage tables are modeled as a set (e.g., {PEOPLE, ADDRESSES, EMAIL, PHONE, . . . }, each of the possible from-types may be modeled as a subset of the possible storage tables. Query manager 230 places each of the accumulated queries in the partition that corresponds to the from-type for that query so that each of the queries in any given partition each have the same from-type.

Once all of the accumulated queries are divided into a corresponding partition, the partitions are ordered. In general, query manager 230 may try to order the partitions so that the partitions that are more likely to generate "larger" query results are ordered before partitions with queries that are more likely to generate "smaller" query results. In some examples, the from-types themselves, when modeled as subsets of storage tables, may be used as a partial basis for ordering the partitions by ordering a first partition in front of a second partition when the from-type of the first partition is a superset of the from-type of the second partition. In general, however, the from-types may not be used as a sole basis for ordering the partitions, because the subset relation provides a partial order among the from-types. In some examples, ordering among partitions where the from-type of neither partition is a subset of the other may be obtained by using the number of rows in the storage tables associated with the from-type and/or by the number of queries in the partitions. As an example, the from-types PEOPLE and ADDRESSES may be ordered based on the number of rows/entries in the PEOPLE and ADDRESSES storage tables. The partition associated with the from-type with the storage table containing more rows/entries is ordered first. In some examples, query manager 230 may determine the number of rows/entries in each storage table by making one or more queries to data source 290.

According to some examples, when a from-type is associated with multiple storage tables (e.g., due to one or more joins in the corresponding queries), the number of rows/entries may be obtained by aggregating the numbers of rows/entries in the respective storage tables. In some examples, the aggregation may total the number of rows/entries over all the respective storage tables or the aggregation may multiply the numbers together to better model the cross-product nature of a join. In some examples, the from-types may not be used when ordering the partitions.

According to some examples, any other partial and/or total ordering based on the from-types and/or other characteristics of the partitions may be used to order the partitions. For example, query manager 230 may monitor queries as they are sent to data source 290. When the results for each of the queries are returned, query manager 230 may note the from-type for the query and the number of results. In some examples, query manager 230 may then use a weighted-sum and/or other aggregation strategy, such as exponential smoothing, to provide an estimate of how many results may be returned by future queries with the same from-type. In some examples, these aggregations may provide a good balance between the number of rows/entries in the corresponding storage tables and the restrictiveness of queries made with the corresponding from-type.

After the partitions are ordered, the second phase begins and the queries are ordered within the partitions. The queries are ordered so that queries that are more likely to return results that are a subset or that are mostly contained in the results from other queries are processed later. This increases the likelihood that the results in these later processed queries may be cached by the data source. Because the extent of the overlap is not fully knowable until after the queries are processed, the ordering may be based on projected behavior of the queries. In some examples, each of the queries in the partition is run against one or more dummy or test sets of data. The dummy sets of data may be generated pseudo-randomly by a data set generator 250. Based on the from-type and further information about the one or more storage tables associated with the from-type, data set generator 250 creates and populates a dummy data set with the appropriate storage tables. In some examples, data set generator 250 receives, as a parameter, a seed for its random number generator from query manager 230. By controlling the seed, query manager 230 is able to have data set generator 250 recreate the same dummy data set for use with later queries with the same from-type. In some examples, the dummy data sets may be identified by the seed and/or some other associated identifier so that they can be reused later.

Each of the queries in the partition is processed against the same dummy data set. In some examples, each of the queries may be altered before processing to simplify comparisons among the various results. In some examples, the select clause in the query may be changed to "SELECT *" so that entire rows/entries of the from-type are returned. In some examples, limit and similar clauses, may be removed so that the corresponding results are not reduced in size in a way that would impact any likely caching when the query is processed against an actual data source. In some examples, order by and group by clauses may be removed to reduce the computational cost of processing the queries against the dummy data set. The results, in the form of a result set, for each of the queries are then retained and analyzed by query manager 230 to determine the order of the queries within the partition.

According to some examples, ordering of the queries within the partition may be based on the cardinality (i.e., the number of entries) in each of the result sets. Queries with larger result sets are ordered to be processed before queries with smaller result sets.

According to some examples, overlaps between the result sets may also be considered. A query with a result set that contains more rows/entries that are also in the result sets of other queries is more likely to improve cache hit rates and is ordered before other queries with a lesser overlap. In some examples, a metric for measuring this overlap is shown in Equation 1, where $RS_i$ is the result set for query i, n is the number of queries, and $|\bullet|$ is the cardinality function.

$$\text{overlap}_i = \Sigma_{j=1}^{n} |RS_i \cap RS_j| \qquad (1)$$

In some examples, Equation 1 may be altered to remove the term where i=j, which has the effect of reducing the overlap metric by the cardinality of the ith result set. After computing the overlap metrics for each of the queries, query manager 230 may order the queries based on the overlap metrics with the queries having higher overlap metrics being ordered for processing first.

According to some examples, cardinality and/or overlap values may be determined based on multiple dummy data sets to reduce any effects caused by the pseudo-random generation of the dummy data sets. When multiple dummy data sets are used, the cardinality and/or overlap values for each of the queries may be aggregated across each of the dummy data sets using an unweighted sum or a weighted sum, such as an average or a total.

Once both the partitions and the queries within each of the partitions are ordered, the accumulated queries are placed in query queue 260. The queries are added to query queue 260 partition by partition, based on the ordering of the partition, and then within the partition based on the ordering within the partition. The queries are then removed from query queue 260 in FIFO order and processed by a query engine 270. As query engine 270 processes each of the queries, it may forward one or more related queries to data source 290 using a data source driver 280. In some examples, data source driver 280 may be data source driver 180 and data source 290 may be data source 190. Once processing of each of the queries is complete, the results are returned via query manager 230 to the respective application 210 that sent the query to query assistant 220.

According to some examples, query engine 290 may be a federated query engine, such as the JBoss Teiid data virtualization engine from Red Hat, Inc., the Oracle Data Service Integrator (ODSI), the InfoSphere Platform from IBM, and/or the like. In some examples, use of a federated query engine allows query assistant 220 to support a broader range of data source types while abstracting query assistant 220 from variations among the features and/or capabilities of the different data sources. In some examples, the federated query engine may also allow query assistant 220 to support queries in a single query language that may be used with data sources of different types and/or data sources from different vendors.

As discussed above and further emphasized here, FIG. 2 is merely an example which should not unduly limit the scope of the claims. One of ordinary skill in the art would recognize many variations, alternatives, and modifications. In some examples, other architectures and/or arrangements of the sub-components of query assistant 220 are possible. In some examples, query manager 230 may use query engine 220 to run the queries against the dummy data sets generated by data set generator 250. In some examples, query manager 230 may provide the random number seed or identifying number associated with each dummy data set to query engine 270 so that each of the queries in one of the partitions may all be run against the same dummy data set. In some examples, query assistant 220 and its sub-components may be part of an enhanced federated query engine that includes the features of a typical federated query engine as well as the features of query assistant 220. In some examples, query assistant 220 may partition the queries and/or run the queries against the dummy data sets as they are received from the applications 210 because the from-type of the query may be determined as soon as the query is received. In some examples, the one or more data structures of query holding area 240 may be organized as a collection of groups of queries, with each group representing a respective partition. In some examples, when query assistant 200 also handles queries for first-come first-served processing, these queries may be inserted into query queue 260 instead of being accumulated in the query holding area 240.

Figure 3:
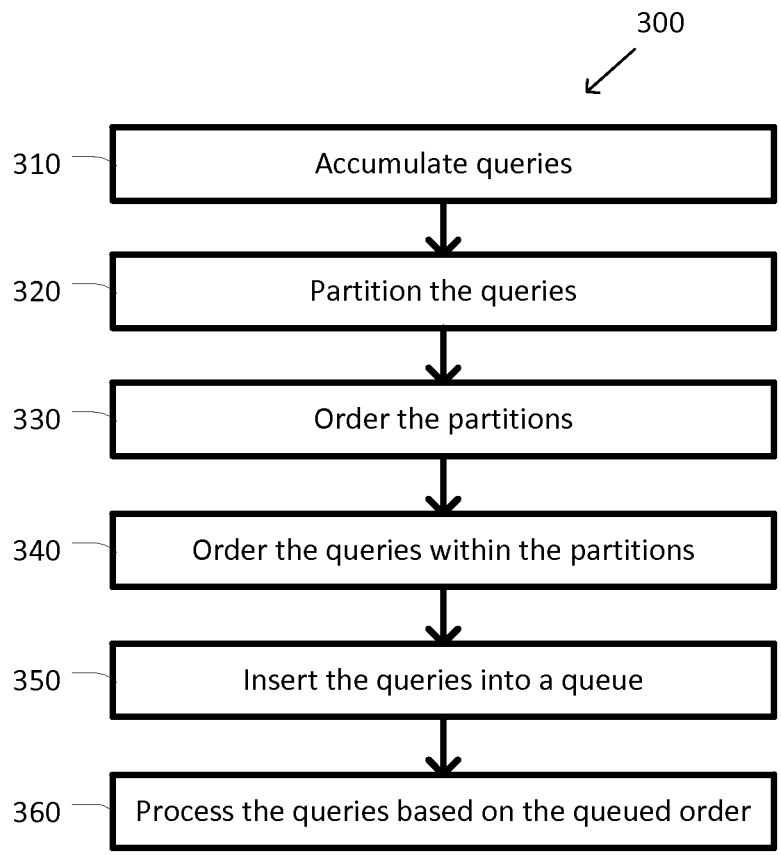
FIG. 3 is a simplified diagram of a method of batch query handling according to some examples.

FIG. 3 is a simplified diagram of a method 300 of batch query handling according to some examples. In some examples, one or more of the processes 310-360 of method 300 may be implemented, at least in part, in the form of executable code stored on non-transient, tangible, machine readable media that when run by one or more processors (e.g., the processor 140 of server 130) may cause the one or more processors to perform one or more of the processes 310-360. In some examples, method 300 may be used by query assistant 220 to receive and process queries.

At a process 310, queries are accumulated. As queries are received by a query assistant, such as query assistant 220, they may be sent to a query manager, such as query manager 230. The query manager may then collect or accumulate them using a query holding area, such as query holding area 240. In some examples, when the query may be batch processed, the query assistant may place the query in the query holding area. In some examples, when the query is to be processed in first-come first-served fashion, the query manager may place the query into a query queue for processing. In some examples, the queries may be received by the query assistant from one or more services and/or applications. In some examples, the services and/or applications may an API call or similar mechanism to send the query to the hybrid multi data source.

Process 310 may continue to accumulate queries in the query holding area until the query assistant determines that it further processing of the accumulated queries is to begin. In some examples, the query manager may wait until a designated number of queries are received and placed in the query holding area, a predetermined amount of time has elapsed, a query queue maintained by the query assistant becomes empty, and/or some combination of these or other criteria. In some examples, the number of queries to accumulate and/or the duration of the predetermined amount of time may be set by an administrator of the query assistant. In some examples, the number of queries may be based on a storage capacity of the query holding area and/or some other resource of the query assistant. In some examples, the predetermined amount of time may be set based on a maximum latency allowed before a query should be processed.

At a process 320, the queries are partitioned. The queries that are accumulated in the query holding area during process 310 are partitioned into disjoint sets. In some examples, the queries may be partitioned based on their respective from-types, with the from-types being determined from the storage/database tables the query accesses. The query assistant may determine the from-type for each of the accumulated queries by examining the from clause of the query. A query accessing a single storage table (e.g., "SELECT FROM PEOPLE WHERE . . . ") has a simple from-type based on the storage table. A query accessing multiple tables (e.g., due to one or more join clauses in the query) has a compound from-type based on each of the storage tables. Each of the partitions is associated with a corresponding from-type so that each of the queries in a partition have the same from-type, and queries with the same from-type are placed in the same partition.

In some examples, the queries may be partitioned as they are received during process 310. When this is the case, the query holding area may be organized around one or more data structures that implement a collection of groups, where each of the groups corresponds to one of the partitions. In some examples, the queries may not be partitioned until after process 310 completes and the query assistant begins additional processing of the accumulated queries.

At a process 330, the partitions are ordered. The partitions created by process 320 are sorted to determine an order in which the partitions will be processed. In some examples, the partitions may be at least partially ordered using the from-types. For example, when the from-types are modeled as subsets of storage tables, the subset comparison operator may be used to partially order the partitions, so that a first partition whose from-type is a superset of a from-type for a second partition may be ordered for processing before the second partition. In some examples, where the subset comparison operator determines that neither from-type is a subset of the other, the query manager may resolve the ordering based on a number of rows/entries in the respective storage tables corresponding to the from-types and/or the number of queries in the partitions. In some examples, the query manager may determine the number of rows/entries in each storage table by making one or more queries to the data source where the storage tables are stored. In some examples, when the from-type includes multiple storage tables, the number of rows/entries in the respective storage tables may be aggregated by adding or multiplying the number of rows/entries together. In some examples, the from-types may be used when ordering the partitions.

According to some examples, any other partial and/or total ordering based on the from-types and/or other characteristics of the partitions may be used to order the partitions. For example, the query manager may monitor queries as they are sent to the data source and record the from-type for each query and the number of results returned for that query. The query manager may use a weighted sum or other aggregation strategy to combine the recorded values for each from-type to make an estimate for the number of results of future queries of the corresponding from-type. In some examples, the aggregation strategy may include exponential smoothing. The partitions may then be sorted in descending order based on the estimated numbers of results for the corresponding from-types.

Figure 4:
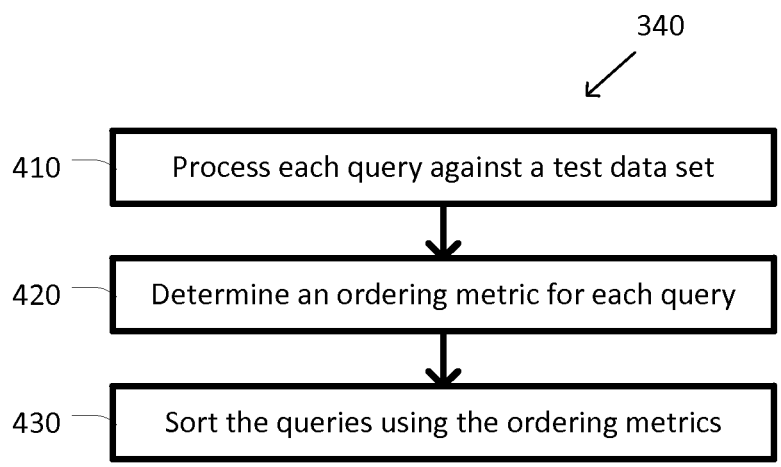
FIG. 4 is a simplified diagram of a process for ordering queries within a partition according to some examples.

At a process 340, the queries within each partition are ordered. In some examples, the queries within each partition may be ordered by processing each of the queries against a dummy or test data set to generate a sample result and then ordering the queries based on a metric derived from the sample results. FIG. 4 is a simplified diagram of the process 340 for ordering queries within a partition according to some examples.

At a process 410, each of the queries is processes against a test data set. In some examples, the query manager may use a data set generator, such as data set generator 250, to pseudo-randomly generate the test data set based on the from-type. In some examples, the query manager may provide the data set generator with a random number seed so that test data sets generated from the same from-type and the same seed are the same. In some examples, the test data sets may be selected based on the seed and/or an assigned identifier so that the test data sets may be reused for more than one query.

In some examples, each of the queries in the partition may be altered before being processed against the dummy data set. In some examples, select clauses may be changed to "SELECT *" to provide uniformity among the entries/rows in the results of each of the queries. In some examples, limit and similar clauses may be removed so that the results include any rows/entries matching the rest of the query. In some examples, order by, group by, and other similar clauses may be removed to reduce extra processing in each of the queries.

Once the test data sets are generated, and the queries are simplified, the queries are processed against the test data sets. The results/result set for each of the queries is then retained for further analysis. In some examples, the processing of the queries against the test data sets may be performed by a query engine, such as query engine 270.

At a process 420, an ordering metric is determined for each of the queries. The result set for each of the queries determined during process 410 is analyzed to determine an ordering or sorting metric for the corresponding query. In some examples, the ordering metric may be based on the number of rows/entries in the corresponding result set. In some examples, the ordering metric may include a measure of the overlap between the result sets using, for example, Equation 1 and/or its variants.

At a process 430, the queries are sorted using the ordering metrics. In some examples, the queries are sorted in descending order based on their respective ordering metric determined during process 420.

According to some examples, processes 410 and 420 may be performed multiple times for each of the partitions. Each time process 410 is repeated for a partition, a different test data set may be used so that multiple result sets are determined for each of the queries in the respective partition. The ordering metric determined during process 420 then becomes an aggregate value based on the ordering metrics from each of the different test data sets. In some examples, when Equation 1 or one of its variants is used to determine overlap among the result sets, Equation 1 is applied separately for each test data set and the separate ordering metrics are aggregated. In some examples, the aggregation may include computing an unweighted or a weighted sum of the ordering metrics associated with each query.

Referring back to FIG. 3, at a process 350, the queries are inserted into a queue. The queries are inserted into a FIFO queue, such as query queue 260. In some examples, the FIFO queue may be the same queue into which first-come first-served queries are inserted. The queries are inserted into the queue based on the ordering of the partitions determined during process 330 and the ordering of the queries within the partition determined during process 340. Starting with the first partition, each of the queries in that first partition is inserted, in order, into the queue. Each of the queries from the second partition is then inserted, in order, into the queue, and the process continues until the queries from each of the partitions is inserted into the queue.

At a process 360, the queries are processed based on the queued order. Each of queries in the queue is removed, in order, from the queue and processed by a query engine, such as query engine 270. As the query engine processes each of the queries, the query engine may forward one or more related queries to the data source using a data source driver. The number, content, and structure of the related queries may be based on the query being processed by the query engine and the amount of query processing being handled in the query engine relative to the amount of query processing being handled by the data source. Once processing of each of the queries is complete, the results are returned to the respective application that sent the query to the query assistant.

Some examples of server 130, application servers 160 and/or 200, and/or query assistant 220 may include non-transient, tangible, machine readable media that include executable code that when run by one or more processors (e.g., processor 140) may cause the one or more processors to perform the processes of method 300 as described above. Some common foul's of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of processing data source queries, the method comprising:
   accumulating the data source queries in a query holding area of a query assistant running in a computer server;
   separating the accumulated data source queries into a plurality of partitions, each of the partitions including data source queries with a respective from-type, each respective from-type being associated with a combination of storage tables accessed by each of the data source queries in a corresponding partition;
ordering the partitions;
ordering the accumulated data source queries within each of the partitions; and
processing the accumulated data source queries in an order based on the ordering of the partitions and the ordering of the data source queries within each of the partitions;
wherein ordering the accumulated data source queries within each of the partitions comprises:
processing a first data source query in a first partition selected from the partitions against a first test data set to determine a first result;
processing a second data source query in the first partition against the first test data set to determine a second result;
determining a first ordering metric based on the first result;
determining a second ordering metric based on the second result; and
ordering the first data source query and the second data source query based on the first ordering metric and the second ordering metric.

2. The method of claim 1, further comprising inserting the accumulated data source queries in a first-in first-out queue based on the ordering of the partitions and the ordering of the data source queries within each of the partitions.

3. The method of claim 1 wherein accumulating the data source queries continues until an accumulation threshold is reached, the accumulation threshold being based on a combination of one or more criteria selected from a group consisting of a number of data source queries that are accumulated in the query holding area, a predetermined period of time, and whether a queue containing previously accumulated data source queries is empty.

4. The method of claim 1 wherein ordering the partitions comprises ordering the partitions based on at least a number of queries in each partition.

5. The method of claim 1 wherein ordering the partitions comprises ordering the partitions based on at least a number of entries stored in storage tables associated with each respective from-type associated with each of the partitions.

6. The method of claim 1 wherein ordering the partitions comprises ordering the partitions based on at least a size of results from recent queries with a same from-type as the respective from-type associated with each of the partitions.

7. The method of claim 1 wherein:
each respective from-type is a subset of a set of storage tables accessed by the accumulated data source queries; and
ordering the partitions comprises ordering the partitions based on at least a subset ordering among from-types associated with the partitions.

8. The method of claim 1 wherein the first ordering metric is based on a number of entries in the first result and the second ordering metric is based on a number of entries in the second result.

9. The method of claim 1 wherein the first ordering metric is based on a number of entries included in the first result that are also included in the second result.

10. The method of claim 1, further comprising generating the first test data set pseudo-randomly based on a first from-type associated with the first partition.

11. The method of claim 1 wherein ordering the accumulated data source queries within each of the partitions further comprises:

processing the first data source query against a second test data set to determine a third result;
processing the second data source query against the second test data set to determine a fourth result;
determining a third ordering metric based on the third result;
determining a fourth ordering metric based on the fourth result; and
ordering the first data source query and the second data source query based on an aggregation of the first and third ordering metrics and an aggregation of the second and fourth ordering metrics.

12. The method of claim 1 wherein ordering the accumulated data source queries within each of the partitions further comprises:
simplifying the first data source query before processing the first data source query against the first test data set; and
simplifying the second data source query before processing the second data source query against the first test data set.

13. A query assistant hosted in an application server executing on a server comprising a processor and memory, the query assistant comprising:
a query manager;
a data set generator coupled to the query manager;
a query holding area coupled to the query manager;
a query queue coupled to the query manager; and
a query engine coupled to the query manager and the query queue;
wherein:
the query holding area is configured to accumulate queries received by the query assistant;
the query manager is configured to:
separate the queries in the query holding area into a plurality of disjoint sets, each of the disjoint sets including queries with a respective from-type, each respective from-type being associated with a combination of data tables accessed by each of the queries in a corresponding disjoint set;
sort the disjoint sets;
sort the queries within each of the disjoint sets; and
insert the queries into the query queue based on the sorting of the disjoint sets and the sorting of the queries within each of the disjoint sets;
the query engine is configured to:
remove the queries in order from the query queue; and
process the queries;
the data set generator is configured to generate a dummy data set based on a first from-type associated with a first disjoint set selected from the disjoint sets; and
the query manager is further configured to:
determine a first result set by having a first query in the first disjoint set processed against the dummy data set;
determine a second result set by having a second query in the first disjoint set processed against the dummy data set;
determine a first sorting metric based on the first result set;
determine a second sorting metric based on the second result set; and
sort the first query and the second query based on the first sorting metric and the second sorting metric.

14. The query assistant of claim 13 wherein the first sorting metric is based on one or more criteria selected from a group consisting of a number of entries in the first result set and a number of entries in an intersection of the first and second result sets.

15. The query assistant of claim 13 wherein the query engine is a federated query engine.

16. A non-transitory machine-readable medium comprising a plurality of machine-readable instructions which when executed by one or more processors associated with an application server are adapted to cause the one or more processors to perform a method comprising:
- accumulating data queries in a query holding area until an accumulation threshold is reached, the accumulation threshold being based on a combination of one or more criteria selected from a group consisting of a number of data queries that are accumulated in the query holding area, a predetermined period of time, and whether a first-in first-out (FIFO) queue containing previously accumulated data queries is empty;
- separating the data queries into a plurality of partitions, each of the partitions including data queries with a respective from-type, each respective from-type being associated with a combination of tables accessed by each of the data source queries in a corresponding partition;
- ordering the partitions;
- ordering the data queries within each of the partitions;
- inserting the accumulated data queries into the FIFO queue based on the ordering of the partitions and the ordering of the data queries within each of the partitions;
- removing the data queries in order from the FIFO queue; and
- processing the data queries;
- wherein ordering the data queries within each of the partitions comprises:
  - generating a data set pseudo-randomly based on a first from-type associated with a first partition;
  - generating a first query result by processing a first data query in the first partition against the data set;
  - generating a second query result by processing a second data query in the first partition against the data set;
  - determining a first ordering metric based on the first query result;
  - determining a second ordering metric based on the second query result; and
  - ordering the first data query and the second data query based on the first ordering metric and the second ordering metric.

17. The non-transitory machine-readable medium of claim 16, wherein the first ordering metric is based on one or more criteria selected from a group consisting of a number of entries in the first query result and a number of entries included in the first query result that are also included in the second query result.

18. The non-transitory machine-readable medium of claim 16 wherein ordering the partitions comprises ordering the partitions based on one or more criteria selected from a group consisting of:
- a number of queries in each partition;
- a number of entries stored in tables associated with each respective from-type associated with each of the partitions;
- a size of query results from recent queries with a same from-type as the respective from-type associated with each of the partitions; and
- an ordering among from-types associated with the partitions.

* * * * *